(12) United States Patent
Chamberlin et al.

(10) Patent No.: US 6,727,822 B2
(45) Date of Patent: Apr. 27, 2004

(54) LIQUID LEVEL SENSOR APPARATUS AND METHOD OF USING THEREOF

(75) Inventors: Edward R. Chamberlin, Cincinnati, OH (US); Paul Linsley, Cincinnati, OH (US)

(73) Assignee: Standex International Corporation, Salem, NH (US)

(*) Notice: Subject to any disclaimer, the term of this patent is extended or adjusted under 35 U.S.C. 154(b) by 0 days.

(21) Appl. No.: 10/410,836

(22) Filed: Apr. 10, 2003

(65) Prior Publication Data
US 2004/0001004 A1 Jan. 1, 2004

Related U.S. Application Data

(63) Continuation-in-part of application No. 10/184,010, filed on Jun. 27, 2002.

(51) Int. Cl.[7] .......................... G08G 21/00; G01F 23/00
(52) U.S. Cl. .................. 340/620; 340/612; 340/618; 340/623; 73/290 R; 73/291; 73/304 R
(58) Field of Search ........................ 340/620, 612, 340/618, 623; 73/290 R, 291, 304 R

(56) References Cited

U.S. PATENT DOCUMENTS

| | | | | |
|---|---|---|---|---|
| 4,305,285 A | * | 12/1981 | Kubota et al. .............. 73/308 |
| 5,294,917 A | * | 3/1994 | Wilkins ...................... 340/625 |
| 6,195,013 B1 | * | 2/2001 | Robinson .................... 340/623 |
| 6,418,788 B2 | * | 7/2002 | Articolo ......................... 73/314 |
| 6,541,758 B2 | * | 4/2003 | Yashiro et al. .......... 250/227.14 |

* cited by examiner

Primary Examiner—Jeffery Hofsass
Assistant Examiner—Lam Pham
(74) Attorney, Agent, or Firm—William B. Ritchie

(57) ABSTRACT

A liquid level sensor apparatus and a method of using thereof for determining the level of a conductive liquid held within a container, wherein the container is subject to the accumulation of residue as a consequence of the conductive liquid contained therein. The liquid level sensor includes a sensor part which has a voltage; a ground connection having an electrical polarity; a circumferential ring having a bias voltage opposite in polarity to the ground connection and a voltage corresponding to that of the sensor attached around the sensor; a float which is buoyant on the conductive liquid; and a conductive tip attached to the top of the float, the conductive tip being conductive with the sensor end when in at least one predetermined position. The bottom of the float is in contact and buoyant on the conductive liquid and the conductive liquid has a level wherein when the level rises, the float rises, and when the conductive tip reaches the at least one predetermined position, a circuit is completed to the ground connection which indicates a condition to the sensor tip. The bias ring prevents a false indication of the condition when residue is present on the container walls by preventing completion of the circuit from the sensor tip to the ground connection.

20 Claims, 3 Drawing Sheets

LIQUID LEVEL SENSOR APPARATUS AND METHOD OF USING THEREOF

This application is a continuation-in-part of pending U.S. patent application Ser. No. 10/184,010, filed Jun. 27, 2002.

FIELD OF THE INVENTION

The present invention relates to the field of sensors and, in particular, to a liquid level sensor apparatus and method of using thereof.

BACKGROUND OF THE INVENTION

The use of devices to indicate the level of liquid within a tank or container is well known in the art. The need for knowing whether a liquid in a container is above or below a predetermined level is found in many very different situations. Typical of those situations where the liquid level must not be permitted to fall below a predetermined level are found in automobile radiators, windshield washer containers or oil in an engine crankcase. The situation where the level can be too high is also common such as found with a recreational vehicle holding tank. Applications for such equipment is also found in industry where frequently the liquid in question in extremely corrosive as experienced with chemical reagent reservoirs which must be filled once the chemical has fallen below a particular amount in order to keep a process running.

A typical float-type of liquid level sensor is disclosed in U.S. Pat. No. 4,386,337, issued to Todd on May 31, 1983. This device is said to be useful for measuring the level of oil in an engine crankcase or transmission fluid in a reservoir. An electrically conductive float disposed within an encapsulator and movably responsive to the liquid level is provided. This movement is then determined. The problem associated with sludge buildup resulting in shorts bypassing the proper electrical pathways is not directly discussed. While Todd does suggest that by having his encapsulator with open upper and lower ends provides for self-flushing of debris, it is unclear how this can inhibit or stop the problems associated with residue formation, particularly as found in older systems.

The type of devices used to measure the liquid level also varied substantially. The use of floats, changes in capacitance, optical readers, weight measurements of the liquid are just a few examples of techniques that have been adopted to serve as an indicator of the surface level of a liquid. Some devices have attempted to utilize non-invasive measures, that is, a sensor that is outside of the liquid container.

Representative of this genre is U.S. Pat. No. 4,749,988, issued to Berman et al, on Jun. 7, 1988. The '988 discloses the use of a pair of conductive band electrodes oriented in parallel so that the gap between the electrodes corresponds to the liquid surface level to be measured. The change in capacitance between the electrodes as the liquid level rises and falls serves as the indicator. While this device solves the corrosive problem found in processing industries using materials in liquid form, its use is limited to containment vessels that have sufficient outside room to put the sensor in place. Further, this type of sensor is expensive to manufacture in that it must be shaped to correspond to the particular shape of the vessel being used. Also, the thickness and material used for the vessel can also appreciably impact the accuracy and sensitivity of the device. Whether this will also solve the problem of residue buildup on the inside of the container is not known as Berman et al. does not discuss this issue.

U.S. Pat. No. 5,315,872, issued to Moser on May 31, 1994, discloses a liquid level sensor for an electrically conductive liquid. The device requires the use of an electrically conductive material for constructing the tank. Thus, many commonly used containers are unsuitable for use with this device without having substantial additional expense. A voltage source supplies an electrical charge to the tank walls, with ground potential supplied to the liquid contained therein. The capacitance between the tank walls and liquid varies with the volume of liquid in the tank. The problem of false "full" readings is not discussed.

One of the potentially simplest and least expensive methods for the measurement of the level of a liquid is the use of an electrically conductive liquid as a part of a resistive circuit to ascertain the level. Representative of this genre is found in U.S. Pat. No. 4,277,773, issued to Blatnik on Jul. 7, 1981. This reference discloses a device for measuring the level of cooling liquid within a radiator. The radiator is grounded and an insulated probe is installed in the radiator and measures the level via interconnecting the sensor with ground to obtain a conductivity measurement. A second sensor is provided to measure a hot liquid level in the same manner. While this device is simple and inexpensive to build, no protection against false "full" readings due to the accumulation of conductive sludge or other residue is disclosed or suggested.

U.S. Pat. No. 5,719,556, issued to Albin et al. on Feb. 17, 1998, discloses still another variation of the liquid level sensor that utilizes the measurement of resistance as an indicator. Albin et al do recognize the problem of shorts from the sensor tip to ground via a conductive path through sludge. However, the inventors claim that merely insulting the sensing rods except at the tip eliminate this problem. Further, their device is quite complicated and expensive requiring the use of alternating current, an oscillator, and filters as well as other circuitry in order to achieve their objectives.

Therefore, a simple conductive-type liquid level sensor for conductive liquids that is easy and inexpensive to manufacture, can be attached in a variety of tanks and containers without substantial modification of those tanks and prevents false "full" indications due to residue buildup is not found in the prior art.

SUMMARY OF THE INVENTION

In accordance with one aspect of the present invention, the invention includes a liquid level sensor apparatus for determining the level of a conductive liquid held within a container having inside walls, one of which is an attachment wall, wherein the container is subject to the accumulation of residue as a consequence of the conductive liquid contained therein. The liquid level sensor includes a sensor having an attachment end and a sensor end, wherein the attachment end of the sensor is connected to the container on the attachment wall such that the sensor end is able to contact the conductive liquid held therein at a conductive liquid level. The sensor has a voltage disposed at the sensor end of the sensor. The liquid level sensor also includes a ground connection having an electrical polarity, the ground connection being in contact with the conductive liquid; a circumferential ring attached around the sensor adjacent to the attachment end of the sensor, wherein the circumferential ring having a bias voltage having the opposite polarity of the ground connection and having a voltage that corresponds to the voltage of the sensor end of the sensor; a float having a top and a bottom and predetermined dimensions, the float being buoyant on the conductive liquid; and a conductive tip attached to the top of the float, the conductive tip being conductive with the sensor end when in at least one predetermined position. The bottom of the float is in contact and buoyant on the conductive liquid and the conductive liquid has a level wherein when the level rises, the float rises, and when the conductive tip reaches the at least one predetermined position, a circuit is completed to the ground connection which indicates a condition to the sensor tip and wherein when the conducting tip does not reach the at least one predetermined position, and wherein when the container contains residue on the container walls the bias voltage on the circumferential ring prevents a false indication of the condition by preventing completion of the circuit from the sensor tip to the ground connection.

Implementation of this aspect of the present invention may include one or more of the following. Where the conductive tip is a metal ball. Where the conductive tip is a metal flat valve. Where the liquid level sensor also includes a capacitor that is connected between the ground connection and the circumferential ring; and a diode that is connected between a wire that provides the voltage to the sensor tip of the sensor and the circumferential ring such that when the sensor tip is charged electrically, the capacitor is also charged and the circumferential ring is also charged to the same polarity as the sensor tip; wherein when the conductive tip reaches the at least one predetermined position the conductive tip causes the sensor tip to change to the potential of the ground connection, providing the sensor tip to indicate the condition and wherein when the conductive tip does not reach the at least one predetermined position, the sensor tip does not indicate the condition for as long as the capacitor remains charged even when the container walls contain the residue. Where electrical power is provided to the apparatus by alternating current in order to reduce electrolysis of conductive parts wherein the electrical charge on the circumferential ring and the conductive liquid are substantially 180 degrees out of phase with respect to one another whereby the circumferential ring and the conductive liquid are of opposite polarity.

In accordance with another aspect of the present invention, the invention includes a method of determining the level of a conducting liquid in a container subject to an accumulation of a conducting residue in contact with the conducting liquid. The method includes the following steps: electrically grounding the conducting liquid so that the liquid is at ground potential; charging a sensor with a sensor voltage that is substantially different than the ground potential of the liquid, wherein the sensor having a conductive area; biasing a portion of the conducting residue with biasing voltage corresponding to the sensor voltage, such that the portion of the charged residue is between the charged sensor and the liquid; contacting the liquid with a float, the float having a conductive tip attached, wherein the float is buoyant on the liquid; contacting the sensor conductive area with the conductive tip so that the sensor voltage drops to ground potential wherein the sensor indicates a condition; removing the conductive piece from the conductive area so that the sensor voltage remains substantially different than the ground potential of the liquid, wherein the condition is no longer provided even when an electrical pathway is provided from the sensor to the liquid via residue, which would, absent the biasing voltage, otherwise give a false indication.

Implementation of this aspect of the present invention may include one or more of the following: where the sensor voltages and the biasing voltage are charged positive; and where the sensor voltage and the biasing voltage are charged with alternating current such that the electrical charge of the biasing voltage and the liquid are substantially 180 degrees out of phase with respect to one another thus the biasing voltage and the liquid are of opposite polarity.

In accordance with another aspect of the invention, the invention is a liquid level sensor apparatus for determining the level of a reference conductive liquid held within a reference container, where the reference container is subject to the accumulation of residue as a consequence of the conductive liquid contained therein, the liquid level sensor includes the following. A tubular container having inside walls, wherein one of the inside walls is an attachment wall and wherein the tubular container is connected to the reference container by a connection tube, and whereby the reference conductive liquid in the reference container can flow interchangeably between the reference container and the tubular container forming a conductive liquid level. The invention also includes a sensor having an attachment end and a sensor end, where the attachment end of the sensor is connected to the attachment wall of the tubular container such that the sensor end is able to contact the conductive liquid held within the tubular container, and wherein the sensor has a voltage disposed at the sensor end of the sensor. A ground connection having an electrical polarity is also includes in the invention. The ground connection is in contact with the conductive liquid. The invention also includes a circumferential ring attached around the sensor adjacent to the attachment end of the sensor. The circumferential ring has a bias voltage having the opposite polarity of the ground connection and has a voltage that corresponds to the voltage of the sensor end of the sensor. The invention includes a float having a top and a bottom and predetermined dimensions, the float being buoyant on the conductive liquid in the tubular container; a conductive tip attached to the top of the float, the conductive tip being conductive with the sensor end when in at least one predetermined position; a connector between the sensor and a receiving end. The connector transmits an electrical signal from the sensor to the receiving end and the bottom of the float being in contact and buoyant on the conductive liquid within the tubular container, and the conductive liquid level within the tubular container being indicative to of the reference conductive liquid level in the reference container, whereby when the reference conductive liquid level rises, the conductive liquid flows through the connection tube into the tubular container wherein the float rises, and when the conductive tip reaches the at least one predetermined position, a circuit is completed to the ground connection which indicates a condition to the sensor tip and the sensor sends the signal to the receiving end. When the container contains residue on the container walls, the bias voltage on the circumferential ring prevents a false indication of the condition by preventing completion of the circuit from the sensor tip to the ground connection, and whereby when the reference conductive liquid level falls, the conductive liquid level inside the tubular container falls, and the float falls, breaking the circuit.

Implementation of this aspect of the present invention may include one or more of the following: where the conductive tip is a metal ball; where the conductive tip is a metal flat valve; where the receiving end is a pump motor; where the reference container is a pump; and where the reference container is a windshield wiper liquid container; and where the reference container is a radiator.

Implementation of this aspect of the present invention may also include one or more of the following. Where a capacitor is connected between the ground connection and the circumferential ring and a diode is connected between a wire that provides the voltage to the sensor tip of the sensor and the circumferential ring such that when the sensor tip is charged electrically, the capacitor is also charged and the circumferential ring is also charged to the same polarity as the sensor tip; when the conductive tip reaches the at least one predetermined position the conductive tip causes the sensor tip to change to the potential of the ground connection, providing the sensor tip to indicate the condition and wherein when the conductive tip does not reach said at least one predetermined position, the sensor tip does not indicate the condition for as long as the capacitor remains charged even when the container walls contain the residue. Also, where electrical power is provided to the apparatus by alternating current in order to reduce electrolysis of conductive parts wherein the electrical charge on the circumferential ring and the conductive liquid are substantially 180 degrees out of phase with respect to one another whereby the circumferential ring and the conductive liquid are of opposite polarity.

In accordance with another aspect of the present invention, the invention includes a method of determining the level of a conducting liquid in a container subject to an accumulation of a conducting residue in contact with the conducting liquid. The method includes the following steps: electrically grounding the conducting liquid so that the liquid is at ground potential; charging a sensor with a sensor voltage that is substantially different than the ground potential of the liquid, wherein the sensor having a conductive area and is located in a tubular container connected to the reference container by a connection tube, wherein the conductive liquid can flow interchangeably between the reference container and the tubular container forming a conductive liquid level and wherein the conductive liquid level in the tubular container is indicative of the conductive liquid level in the reference container; biasing a portion of the conducting residue with biasing voltage corresponding to the sensor voltage, such that the portion of the charged residue is between the charged sensor and the liquid; contacting the liquid with a float, the float having a conductive tip attached, wherein the float is buoyant on the conductive liquid in the tubular container; contacting the sensor conductive area with the conductive piece so that the sensor voltage drops to ground potential wherein the sensor indicates a condition; removing the conductive tip from the conductive area so that the sensor voltage remains substantially different than the ground potential of the liquid, wherein the condition is no longer provided even when an electrical pathway is provided from the sensor to the liquid via residue, which would, absent the biasing voltage, otherwise give a false indication.

Implementation of this aspect of the present invention may include one or more of the following: where the sensor voltage sand the biasing voltage are charged positive; and where the sensor voltage and the biasing voltage are charged with alternating current such that the electrical charge of the biasing voltage and the liquid are substantially 180 degrees out of phase with respect to one another thus the biasing voltage and the liquid are of opposite polarity.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
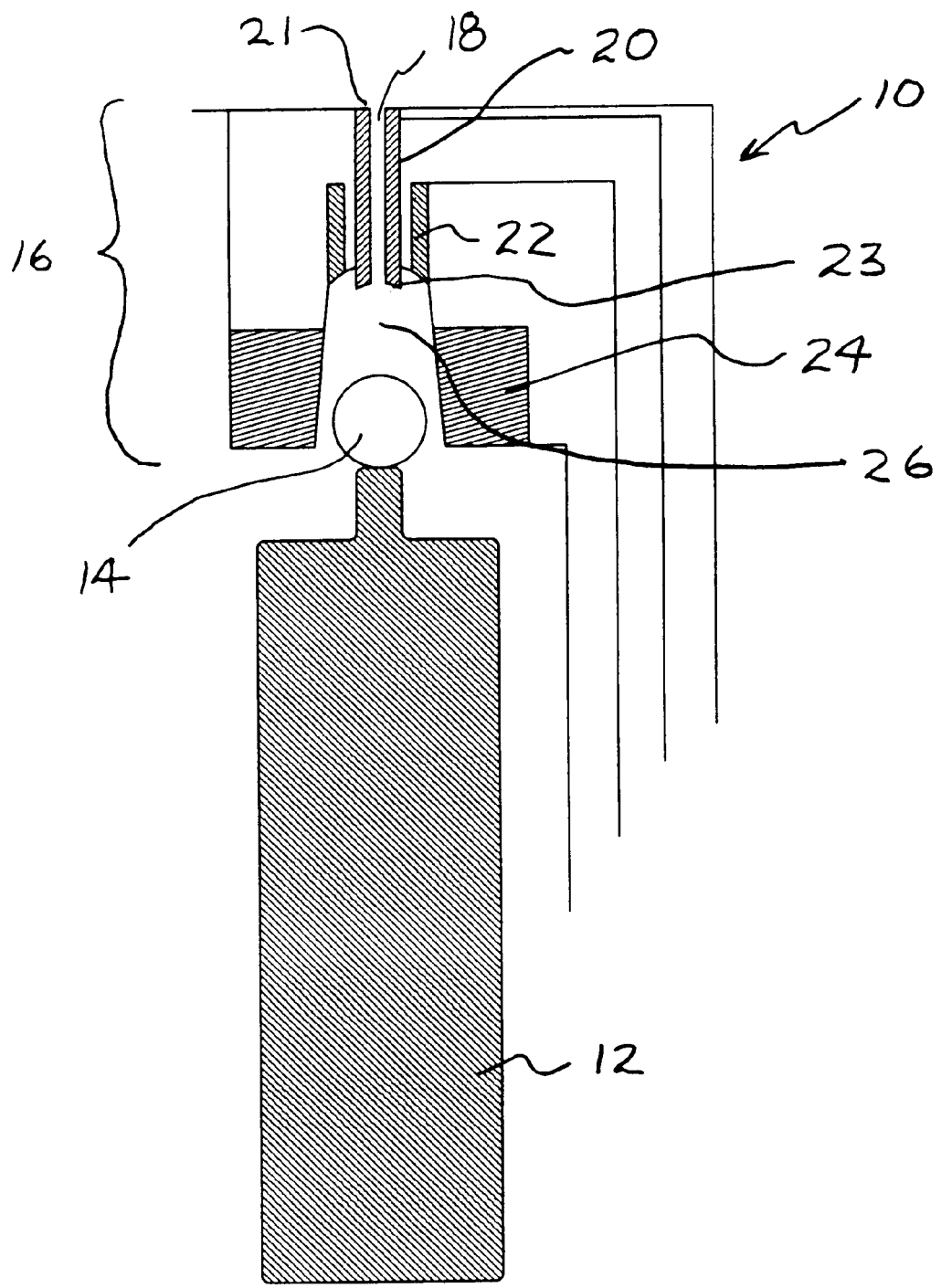
FIG. 1 is a cross sectional view of the preferred embodiment of the present invention.

Referring first to FIG. 1, the preferred embodiment of the invention is shown. A float 12 floats on the surface of any reference liquid. The float 12 is movable along a vertical axis. The invention is used in a liquid reservoir to measure the level of liquid in a reference reservoir or container (shown in FIG. 3). In the preferred embodiment, the float 12 is a hollow plastic cylinder. In the preferred embodiment, the float 12 has the following approximate dimensions: ½" wide, ½" long and 2" deep. In other embodiments, the float is a cube, or a rectangle with any other dimensions capable of fitting into the container, leaving proper clearance between the wall of the tube or container, and the float 12, where the invention will be used to measure the liquid level.

Figure 2:
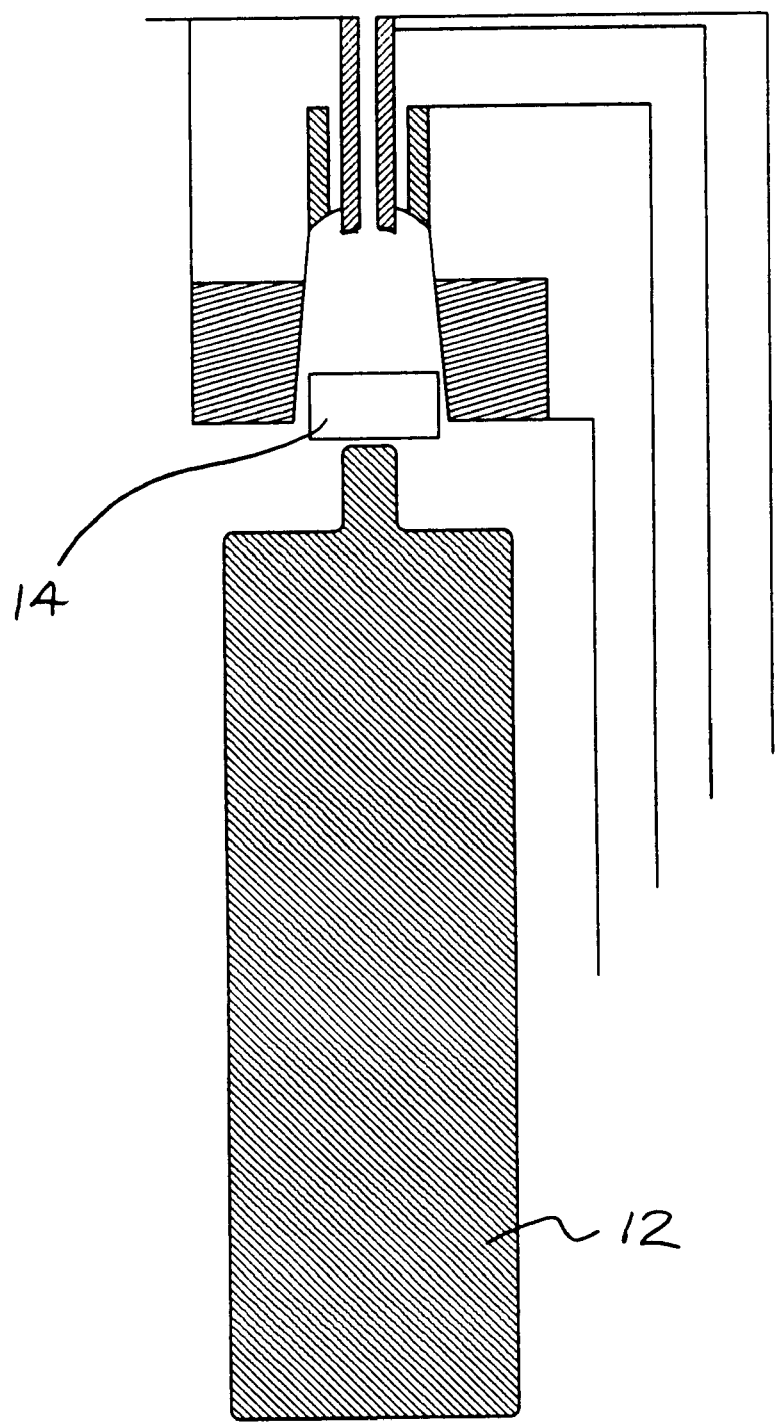
FIG. 2 is a cross sections view of an alternate embodiment of the present invention.

Connected to the top of the float 12 is a conductor ball valve 14. The conductor ball valve 14, since it is connected to the float 12, moves up and down with the float 12 in response to a reference liquid level. The conductor ball valve 14 is made from any metal commonly used in the art for conduction, including silver, copper, aluminum, stainless steel, and nickel. In the preferred embodiment, the conductor ball 14 is made from brass or stainless steel. In other embodiments, the conductor ball is not a ball, but a metal flat valve 14, as shown in FIG. 2. In still other embodiments, the conductor ball 14 is a cube or any other shape capable of performing the function of the conductor ball 14.

Although the invention will be described only with reference to FIG. 1, it is to be understood that the elements and functions described in relation to FIG. 1 apply to FIG. 2, the alternate embodiment of the invention. Referring now to FIG. 1, a metal tip 16 with a vent hole 18 is located above the float 12 and conductor ball 14 (or metal flat valve 14 as shown in FIG. 2). The vent hole 18 allows air from the liquid container to escape to the outside when the liquid level rises and allows air into the liquid container when the liquid level drops. The vent hole 18 prevents air from being trapped in the top of the liquid container, which would otherwise prevent the liquid in the container from seeking the same level as the level in the reference reservoir.

Still referring to FIG. 1, the metal tip 16 is made up of a sensor tip 20, a circumferential ring referred to as a bias ring 22 and a ground ring 24. The sensor tip 20 acts as the electrical sensor. The sensor tip 20 is a conductivity sensor and has a voltage. The sensor tip 20 has an attachment end 21 and a sensor end 23. The attachment end 21 attaches to the liquid reservoir, and the sensor end 20 senses the conductivity. Around the sensor tip 20 is the bias ring 22. The bias ring 22 maintains a bias voltage equal to the voltage of the sensor tip 20 and functions to eliminate the effect of residue in the liquid on the sensor tip 20. The bias ring 22 acts to prevent the sensor tip 20 from incorrectly sensing that the liquid is in contact with the sensor tip 20. By using the bias ring 22, the sensor can be made substantially smaller yet still be immune to problems relating to sludge. Below the bias ring 22 is the ground ring 24 that provides electrical ground for the sensor tip 20. The ground ring 24 has the opposite polarity of the bias ring 22.

A capacitor is connected between the ground ring 24 and the bias ring 22 and a diode is connected between a wire that provides the voltage and the sensor tip of the sensor and the bias ring. When the sensor tip is charged electrically, the capacitor is also charged and the bias ring is then charged to the same polarity of the sensor tip.

In practice, the invention works as follows. Once again, although the following description will refer only to FIG. 1, it will be understood that the alternate embodiment, shown in FIG. 2, functions identically with one exception: a metal flat valve 14 is used in place of the conductor ball 14. Referring to FIG. 1, the conductor ball 14 acts as both an conductive path for sensor tip 20 and a one-way fluid valve. With respect to its function as a liquid valve, the conductor ball 14 can rise to seat itself in the space 26 blocking any liquid from exiting the vent hole. Because the conductor ball 14 rests on the float 12, the conductor ball 14 will rise to seat itself in the space 26 with the liquid level and close the vent hole 18.

With respect to the function of conductor ball 14 as an electrical switch, the conductor ball 14 acts as a conductor in the path of the sensor tip 20. When the conductor ball 14 is in a position to be conductive with the sensor tip 20, the conductor ball 14 causes the sensor tip 20 to change to the potential of the ground ring 24, the sensor tip 20 will in turn provide a signal. When the liquid is low, the conductor ball 14 will not be seated in the space 26 and the sensor tip 20 will be at approximately the same potential as the bias ring 22. This will turn off the signal. However, when the liquid level rises, the float 12 also rises, and the conductor ball 14 will seat in the space 26 and provides a conductive path from the sensor tip 20 to the ground ring 24. While the conductor ball 14 seats itself in the space 26, it is not necessary that the conductor ball 14 make contact with the sensor tip 20. Although in some embodiments, the geometry and dimensions of the conductor ball 14 (or the metal flat valve 14 or other shapes used in alternate embodiments) is such that metal-to-metal contact with the sensor tip 20 when the conductor ball 14 is seated in the space 26 occurs, and metal-to-metal path from ground ring 24 to conductor ball 14 to sensor tip 20 occurs, in the preferred embodiment, metal-to-metal contact does not occur. In the preferred embodiment of the invention, the geometry is such that metal-to-metal contact is not necessary for the conductivity sensor, (the sensor tip 20); rather, a small amount of liquid between the conductor ball 14 and the sensor tip 20 provides adequate conductivity for the sensor to be effective.

A capacitor (not shown) is connected between the ground ring 24 and the bias ring 22. A diode is connected between a wire that provides voltage to the sensor tip 20 and the bias ring 22. When the sensor tip 20 is electrically charged, the capacitor is also charged and the bias ring 22 is charged to the same polarity as the sensor tip 20. Electrical power is provided to the invention by alternating current in order to reduce electrolysis of conductive parts. The electrical charge on the bias ring 22 and the conductive liquid are substantially 180 degrees out of phase with respect to one another. The bias ring 22 and the conductive liquid are of opposite polarity.

The conductor ball 14 used in the preferred embodiment works most efficiently for it reduces the size of the invention and provides a more efficient electrical path than alternate embodiments described above.

Figure 3:
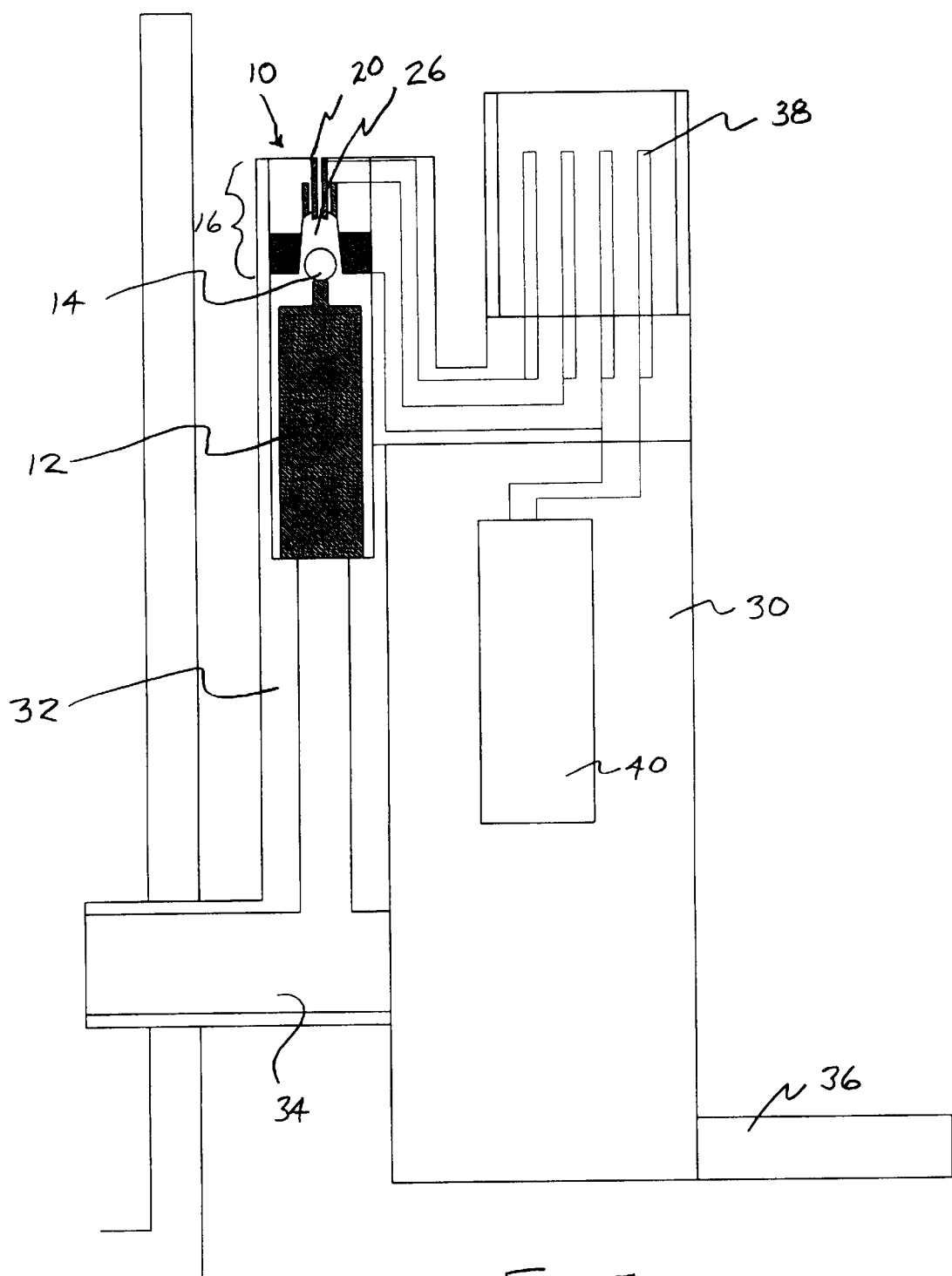
FIG. 3 is a cross sectional view of the preferred embodiment of the present invention connected to a pump.

Referring now to FIG. 3, the invention 10 is shown in a tubular container 32 which is connected to a tank 30. The invention 10 could be used inside the tank 30, but, in this embodiment, the invention 10 is located in a separate tubular container 32. The tank 30 could be a radiator, wind washer container, brake liquid container or any tank or container having a stored conductive liquid which must be maintained below or at a predetermined level. As noted above, many elaborate schemes have been developed to determine when liquid is less than a level. However, the least expensive of these is a simple conductive circuit having a sensor that causes a light or other indicator well known in the art to be either activated or deactivated once the liquid is below or at a level.

Still referring to FIG. 3, the invention 10 is shown inside a tubular container 32. The tubular container 32 must be dimensioned such that there is proper clearance between the float and the walls of the tubular container 32. Although not shown, a tapered wall around the conductor ball 14 can be used in order to increase efficiency. The tubular container 32 is connected to the tank 30 by a connection tube 34 at the bottom of the tank 30, where the tank 30 intake port 36 is also located. The liquid, which eventually becomes the reference liquid, flows into the tank 30 via the intake port 36. The liquid rises up the tank 30, and at a set point, flows through the connection tube 34 and into the tubular container 32. As the reference liquid level increases in the tank 30, the liquid rises in the tubular container 32 causing the float 12 to rise with the reference liquid level. When the float 12 rises to the point where the conductor ball 14 seats itself into the space 26 and either close enough to the sensor tip 20 for adequate conductivity, or touches the sensor tip 20, providing metal-to-metal conductivity, the sensor tip 20 sends a signal, via the connector 38. The connector 38 connects the sensor tip 20 (or conductive sensor) to a tank controller 40. As shown in FIG. 3, the tank controller 40 is located inside the tank 30. However, in other embodiments, the tank controller 40 can be located outside the tank 30. In the preferred embodiment, the tank 30 is a pump and the tank controller 40 is a pump motor controlling the uptake of reference liquid into the tank 30 via the intake port 36. In other embodiments, the tank 30 may be a windshield wiper container, and the connector 38 connects the sensor tip 20 to a lights. When the conductor ball 14 conducts with the sensor tip 20, the light turns off, indicating the liquid level is acceptable. However, when there is no conductivity between the conductor ball 14 and the sensor tip 20, the connector 38 turns the light on, indicating more reference liquid is needed. The windshield wiper liquid embodiment function and design can also be applied to other embodiments, where the tank is a radiator or brake liquid container or any tank or container having a stored conductive liquid which must be maintained below or at a predetermined level.

Still referring to FIG. 3, in other embodiments, the invention 10 can be placed inside the tank 30 and the metal tip 16 is fixedly attached to any position inside the tank 30. The desired reference liquid level will dictate the position of the metal tip 16. The float 12 dimensions will increase in these embodiments to reflect the increased size of the tank 30 as compared to the tubular container 32. In other embodiments, two connection tubes 34 may be connected to the tank 30. Inside each of the connection tubes 34 is the invention 10. This embodiment can be used in order to sense two different liquid levels. Other embodiments include the use of two sensor tip 20 positions, in response to varied conductance between the conductor ball 14 and the sensor tip 20. For example, at an increased conductance, the sensor tip 20 will send a difference signal through the connector 38, and at a decreased conductance, when the conductor ball 14 is further away from the sensor tip 20; the sensor tip 20 will send a different signal.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A liquid level sensor apparatus for determining the level of a conductive liquid held within a container having inside walls, one of which is an attachment wall, wherein the container is subject to the accumulation of residue as a consequence of said conductive liquid contained therein, said liquid level sensor comprising:

a sensor having an attachment end and a sensor end, wherein said attachment end of said sensor is connected to said container on said attachment wall such that said sensor end is able to contact said conductive liquid held therein at a conductive liquid level, said sensor having a voltage disposed at the sensor end of said sensor;

a ground connection having an electrical polarity, said ground connection being in contact with said conductive liquid;

a circumferential ring attached around said sensor adjacent to said attachment end of said sensor, wherein said circumferential ring having a bias voltage having the opposite polarity of said ground connection and having a voltage that corresponds to said voltage of said sensor end of said sensor;

a float having a top and a bottom and predetermined dimensions, said float being buoyant on said conductive liquid; and a conductive tip attached to said top of said float, said conductive tip being conductive with said sensor end when in at least one predetermined position;

wherein said bottom of said float being in contact and buoyant on said conductive liquid and said conductive liquid having said level wherein when said level rises, said float rises, and when said conductive tip reaches said at least one predetermined position, a circuit is completed to said ground connection which indicates a condition to said sensor tip and wherein when said conducting tip does not reach said at least one predetermined position, and wherein when said container contains residue on said container walls said bias voltage on said circumferential ring prevents a false indication of said condition by preventing completion of said circuit from said sensor tip to said ground connection.

2. The apparatus claimed in claim 1 wherein said conductive tip is a metal ball.

3. The apparatus claimed in claim 1 wherein said conductive tip is a metal flat valve.

4. The liquid level sensor of claim 1 further comprising:

a capacitor that is connected between said ground connection and said circumferential ring; and a diode that is connected between a wire that provides said voltage to said sensor tip of said sensor and said circumferential ring such that when said sensor tip is charged electrically, said capacitor is also charged and said circumferential ring is also charged to the same polarity as said sensor tip;

wherein when said conductive tip reaches said at least one predetermined position said conductive tip causes said sensor tip to change to the potential of said ground connection, providing said sensor tip to indicate said condition and wherein when said conductive tip does not reach said at least one predetermined position, said sensor tip does not indicate said condition for as long as said capacitor remains charged even when said container walls contain said residue.

5. The liquid level sensor claimed in claim 1 wherein electrical power is provided to said apparatus by alternating current in order to reduce electrolysis of conductive parts wherein said electrical charge on said circumferential ring and said conductive liquid are substantially 180 degrees out of phase with respect to one another whereby said circumferential ring and said conductive liquid are of opposite polarity.

6. A method of determining the level of a conducting liquid in a container subject to an accumulation of a conducting residue in contact with said conducting liquid, said method comprising the steps of:

electrically grounding said conducting liquid so that said liquid is at ground potential;

charging a sensor with a sensor voltage that is substantially different than said ground potential of said liquid, wherein said sensor having a conductive area;

biasing a portion of said conducting residue with biasing voltage corresponding to said sensor voltage, such that said portion of said charged residue is between said charged sensor and said liquid;

contacting said liquid with a float, said float having a conductive tip attached, wherein said float is buoyant on said liquid;

contacting said sensor conductive area with said conductive tip so that said sensor voltage drops to ground potential wherein said sensor indicates a condition;

removing said conductive from said conductive tip area so that said sensor voltage remains substantially different than said ground potential of said liquid, wherein said condition is no longer provided even when an electrical pathway is provided from said sensor to said liquid via residue, which would, absent said biasing voltage, otherwise give a false indication.

7. The method claimed in claim 6 wherein said sensor voltage sand said biasing voltage is charged positive.

8. The method claimed in claim 6 wherein said sensor voltage and said biasing voltage are charged with alternating current such that said electrical charge of said biasing voltage and said liquid are substantially 180 degrees out of phase with respect to one another thus said biasing voltage and said liquid are of opposite polarity.

9. A liquid level sensor apparatus for determining the level of a reference conductive liquid held within a reference container, wherein the reference container is subject to the accumulation of residue as a consequence of said conductive liquid contained therein, said liquid level sensor apparatus comprising:

a tubular container having inside walls, wherein one of said inside walls is an attachment wall and wherein said tubular container is connected to said reference container by a connection tube, and whereby said reference conductive liquid in said reference container can flow interchangeably between said reference container and said tubular container forming a conductive liquid level;

a sensor having an attachment end and a sensor end, wherein said attachment end of said sensor is connected to said attachment wall of said tubular container such that said sensor end is able to contact said conductive liquid held within said tubular container, and wherein said sensor having a voltage disposed at the sensor end of said sensor;

a ground connection having an electrical polarity, said ground connection being in contact with said conductive liquid;

a circumferential ring attached around said sensor adjacent to said attachment end of said sensor, and wherein said circumferential ring having a bias voltage having the opposite polarity of said ground connection and having a voltage that corresponds to said voltage of said sensor end of said sensor;

a float having a top and a bottom and predetermined dimensions, said float being buoyant on said conductive liquid in said tubular container; and a conductive tip attached to said top of said float, said conductive tip being conductive with said sensor end when in at least one predetermined position;

a connector between said sensor and a receiving end, whereby said connector transmits an electrical signal from said sensor to said receiving end;

wherein said bottom of said float being in contact and buoyant on said conductive liquid within said tubular container, and said conductive liquid level within said tubular container being indicative to of said reference conductive liquid level in said reference container, whereby when said reference conductive liquid level rises, said conductive liquid flows through said connection tube into said tubular container wherein said float rises, and when said conductive tip reaches said at least one predetermined position, a circuit is completed to said ground connection which indicates a condition to said sensor tip and said sensor sends said signal to said receiving end, and wherein when said tubular container contains residue on said container walls said bias voltage on said circumferential ring prevents a false indication of said condition by preventing completion of said circuit from said sensor tip to said ground connection, and whereby when said reference conductive liquid level falls, said conductive liquid level inside said tubular container falls, and said float falls, breaking said circuit.

10. The apparatus claimed in claim 9 wherein said conductive tip is a metal ball.

11. The apparatus claimed in claim 9 wherein said conductive tip is a metal flat valve.

12. The apparatus claimed in claim 9 wherein said receiving end is a pump motor.

13. The apparatus claimed in claim 9 wherein said reference container is a pump.

14. The apparatus claimed in claim 9 wherein said reference container is a windshield wiper liquid container.

15. The apparatus claimed in claim 9 wherein said reference container is a radiator.

16. The liquid level sensor of claim 9 further comprising:

a capacitor that is connected between said ground connection and said circumferential ring; and a diode that is connected between a wire that provides said voltage to said sensor tip of said sensor and said circumferential ring such that when said sensor tip is charged electrically, said capacitor is also charged and said circumferential ring is also charged to the same polarity as said sensor tip;

wherein when said conductive tip reaches said at least one predetermined position said conductive tip causes said sensor tip to change to the potential of said ground connection, providing said sensor tip to indicate said condition and wherein when said conductive tip does not reach said at least one predetermined position, said sensor tip does not indicate said condition for as long as said capacitor remains charged even when said container walls contain said residue.

17. The liquid level sensor claimed in claim 9 wherein electrical power is provided to said apparatus by alternating current in order to reduce electrolysis of conductive parts wherein said electrical charge on said circumferential ring and said conductive liquid are substantially 180 degrees out of phase with respect to one another whereby said circumferential ring and said conductive liquid are of opposite polarity.

18. A method of determining the level of a conducting liquid in a reference container subject to an accumulation of a conducting residue in contact with said conducting liquid, said method comprising the steps of:

electrically grounding said conducting liquid so that said liquid is at ground potential;

charging a sensor with a sensor voltage that is substantially different than said ground potential of said liquid, wherein said sensor having a conductive area and is located in a tubular container connected to said reference container by a connection tube, wherein said conductive liquid can flow interchangeably between said reference container and said tubular container forming a conductive liquid level and wherein said conductive liquid level in said tubular container is indicative of said conductive liquid level in said reference container;

biasing a portion of said conducting residue with biasing voltage corresponding to said sensor voltage, such that said portion of said charged residue is between said charged sensor and said liquid;

contacting said liquid with a float, said float having a conductive tip attached, wherein said float is buoyant on said conductive liquid in said tubular container;

contacting said sensor conductive area with said conductive piece so that said sensor voltage drops to ground potential wherein said sensor indicates a condition;

removing said conductive tip from said conductive area so that said sensor voltage remains substantially different than said ground potential of said liquid, wherein said condition is no longer provided even when an electrical pathway is provided from said sensor to said liquid via residue, which would, absent said biasing voltage, otherwise give a false indication.

19. The method claimed in claim 18 wherein said sensor voltage and said biasing voltage are charged positive.

20. The method claimed in claim 18 wherein said sensor voltage and said biasing voltage are charged with alternating current such that said electrical charge of said biasing voltage and said liquid are substantially 180 degrees out of phase with respect to one another thus said biasing voltage and said liquid are of opposite polarity.

* * * * *